US009881350B2

United States Patent
Cain et al.

(10) Patent No.: US 9,881,350 B2
(45) Date of Patent: *Jan. 30, 2018

(54) SYSTEM AND METHOD FOR EMBEDDING DATA

(71) Applicant: Cisco Technology, Inc., San Jose, CA (US)

(72) Inventors: Harel Cain, Jerusalem (IL); Michal Devir, Haifa (IL)

(73) Assignee: Cisco Technology, Inc., San Jose, CA (US)

( * ) Notice: Subject to any disclaimer, the term of this patent is extended or adjusted under 35 U.S.C. 154(b) by 236 days.

This patent is subject to a terminal disclaimer.

(21) Appl. No.: 14/848,353

(22) Filed: Sep. 9, 2015

(65) Prior Publication Data

US 2015/0379660 A1    Dec. 31, 2015

Related U.S. Application Data

(63) Continuation of application No. 14/271,751, filed on May 7, 2014, now Pat. No. 9,208,534.

(51) Int. Cl.
*G06K 9/00* (2006.01)
*G06T 1/00* (2006.01)
*H04N 19/467* (2014.01)
*H04N 1/32* (2006.01)
*H04N 5/913* (2006.01)

(52) U.S. Cl.
CPC .......... *G06T 1/0092* (2013.01); *G06T 1/0028* (2013.01); *H04N 1/32144* (2013.01);
(Continued)

(58) Field of Classification Search
None
See application file for complete search history.

(56) References Cited

U.S. PATENT DOCUMENTS

| 5,960,081 A | 9/1999 | Vynne et al. |
| 6,381,341 B1 | 4/2002 | Rhoads |

(Continued)

FOREIGN PATENT DOCUMENTS

WO    WO2013/055206    4/2013

OTHER PUBLICATIONS

Osca Divorra Escoda et al., "Influence of a Large Image Watermarking Scheme Parallelization on Possible Attacks"; Proc. SPIE 4472, Applications of Digital Image Processing XXIV, 175 (Dec. 7, 2001).

(Continued)

*Primary Examiner* — Soo Park
(74) *Attorney, Agent, or Firm* — Samuel M. Katz

(57) ABSTRACT

In one embodiment, a watermark is embedded in a sequence of video frames, for each one of the video frames, a set of N rectangular patches, two palettes of pixel values in a selected color space, such that the two palettes are denoted as P0 and P1, and P0≠P1, and in each one of the N patches a processor which chooses one of P0 and P1 according to a value of a payload bit to be encoded, a calculator which calculates one of a variance of pixel values in the frame, and edginess for the pixel values in the frame, thereby determining a calculated value, and a processor which determines if the calculated value is beneath a given threshold value, if the calculated value is beneath the given threshold value the processor is operative to calculate a function of the pixel values, the closest value to a result of the calculation of the function in the chosen palette is chosen, and a replacer which replaces the pixel values within the patch with the chosen closest value. Related systems, apparatus and methods are also described.

16 Claims, 8 Drawing Sheets

(52) U.S. Cl.
CPC ..... *H04N 1/32208* (2013.01); *H04N 1/32229* (2013.01); *H04N 1/32309* (2013.01); *H04N 19/467* (2014.11); *G06T 2201/0051* (2013.01); *G06T 2201/0061* (2013.01); *H04N 2005/91335* (2013.01)

(56) References Cited

U.S. PATENT DOCUMENTS

| | | | |
|---|---|---|---|
| 6,434,701 B1 | 8/2002 | Kwan | |
| 6,798,893 B1 | 9/2004 | Tanaka | |
| 6,879,701 B1 | 4/2005 | Rhoads | |
| 7,672,373 B2 | 3/2010 | Toebes et al. | |
| 7,965,861 B2 | 6/2011 | Agaian | |
| 8,050,452 B2* | 11/2011 | Bradley | G06T 1/0064 382/100 |
| 8,135,168 B2 | 3/2012 | Geyzel et al. | |
| 8,280,100 B2 | 10/2012 | Kihara | |
| 8,588,461 B2 | 11/2013 | Webb | |
| 8,861,931 B2* | 10/2014 | Lee | H04N 5/913 386/248 |
| 9,208,534 B2* | 12/2015 | Cain | G06T 1/0092 |
| 2004/0013284 A1* | 1/2004 | Yu | G06T 1/0028 382/100 |
| 2004/0022444 A1* | 2/2004 | Rhoads | G06K 9/00577 382/232 |
| 2010/0100971 A1 | 4/2010 | Geyzel et al. | |
| 2010/0215342 A1* | 8/2010 | Lee | H04N 5/913 382/100 |
| 2011/0044494 A1* | 2/2011 | Bradley | G06T 1/0064 382/100 |
| 2011/0228971 A1 | 9/2011 | Webb | |
| 2015/0030200 A1* | 1/2015 | Petrovic | G06T 1/0028 382/100 |

OTHER PUBLICATIONS

Frank Hartung et al., "Multimedia Watermarking Techniques", Proceedings of the IEEE, vol. 87, pp. 1079-1107 (Jul. 1999).

Deepa Kundur et al., "Toward Robust LOGO Watermarking using Multiresolution Image Fusion Principles"; (Abstract); Pennsylvania State University 2010.

Sang-Woo Lee et al., "Novel Robust Video Watermarking Algorithm based on Adaptive Modulation"; ICACt2012, pp. 225-229 (Feb. 22, 2012).

Saraju P. Mohanty, "Digital Watermarking: A Tutorial Review"; (1999).

Saraju P. Mohanty, Invisible Watermarking Based on Creation and Robust Insertion-Extraction of Image Adaptive Watermarks (2008).

Fabien Petitcolas et al., "Digital Watermarking Frequently Asked Questions", (Watermarking World Oct. 14, 2001).

I. Pitas, "Research on Digital Watermarking at Aristotle University of Thessaloniki".

Vidgasagar M. Potdar et al., "A Survey of Digital Image Watermarking Techniques"; published in Industrial Informatics, 2005. INDIN '05. 2005 3rd IEEE International Conference on Aug. 10, 2005.

Alastair Reed et al., "Adaptive Color Watermarking"; Proc. SPIE 4675, Security and Watermarking of Multimedia Contents IV, 222 (Apr. 29, 2002).

Min Wu et al., "Data Hiding in Image and Video: Part 1—Fundamental Issues and Solutions"; IEEE Transactions on Image Processing, vol. 12 No. 6, pp. 685-695 (Jun. 2003).

K. Yamato et al., "Digital Image Watermarking Method using Between-Class Variance" (Abstract) IEEE 2012.

Bodo Yann et al., "A Scrambling Method based on Disturbance of Motion Vector"; Mutimedia '02, pp. 89-90 (Dec. 6, 2002).

Civolution, "Audio andVideo Watermarking" (2014) Can be seen at: http://www.civolution.com/technology/digital-audio-and-video-watermarking.

M. Cancellaro et al., "A Commutative Digital Image Watermarking and Encryption Method in the Tree Structured Haar Transform Domain"; Signal Processing 26: 2-12 (Elsevier 2010).

Office Communication in connection with PCT/IB2015/053273 (Partial Search Report); dated Jul. 13, 2015.

Notice of Allowance (dated Jun. 24, 2015) in connection with U.S. Appl. No. 14/271,751.

International Search Report and Written Opinion, dated Sep. 22, 2015, cited in a corresponding application (PCT/IB2015/053273).

* cited by examiner

FIG. 5C

SYSTEM AND METHOD FOR EMBEDDING DATA

RELATED APPLICATION INFORMATION

The present application is a continuation of allowed U.S. patent application Ser. No. 14/271,751, as yet unpublished, filed on 7 May 2014 and entitled "System and Method for Embedding Data".

FIELD OF THE INVENTION

The present invention generally relates to systems and methods for embedding video watermarks.

BACKGROUND OF THE INVENTION

With the recent advances in Internet content distribution, including peer-to-peer networks and real-time video streaming systems, in order to prevent unauthorized distribution of content, it becomes important to embed data in video to trace the point of distribution. The point of distribution is often an authorized viewer, such as a cinema where pirated copies are made with camcorders, or a set-top-box TV decoder whose output is captured and re-encoded into a video file. After tracing the source, measures can be taken to prevent further unauthorized distribution.

Embedding signals in video is a rich field both in academic research and commercial inventions. Covert watermarking in the video is well known in the art, as are overt watermarks that appear as bitmaps on top of the video, and steganographic watermarks.

BRIEF DESCRIPTION OF THE DRAWINGS

The present invention will be understood and appreciated more fully from the following detailed description, taken in conjunction with the drawings in which:

FIGS. 5A-5C are depictions of mutually distinct palettes depicted in, respectively, one-, two-, and three-dimensional color space, for use in the discussion of FIGS. 4A and 4B;

DESCRIPTION OF EXAMPLE EMBODIMENTS

Overview

A method, apparatus, and system for embedding and detecting a watermark are described. For embedding, small areas of pixels are replaced in each frame that originally have one of low variance or with low level of edges (i.e. edginess), as determined using edge detection processes known in the art, with a fixed color value taken out of one of two palettes of colors which is closest to their original average value, according to the payload bits to be embedded, and then compressing the video.

For detecting the watermark, it is determined which of the two palettes was used in each of the small areas of pixels. This determination may incur errors because of compression, but the method, system, and apparatus are constructed so as to overcome these errors.

Exemplary Embodiment

Figure 1:
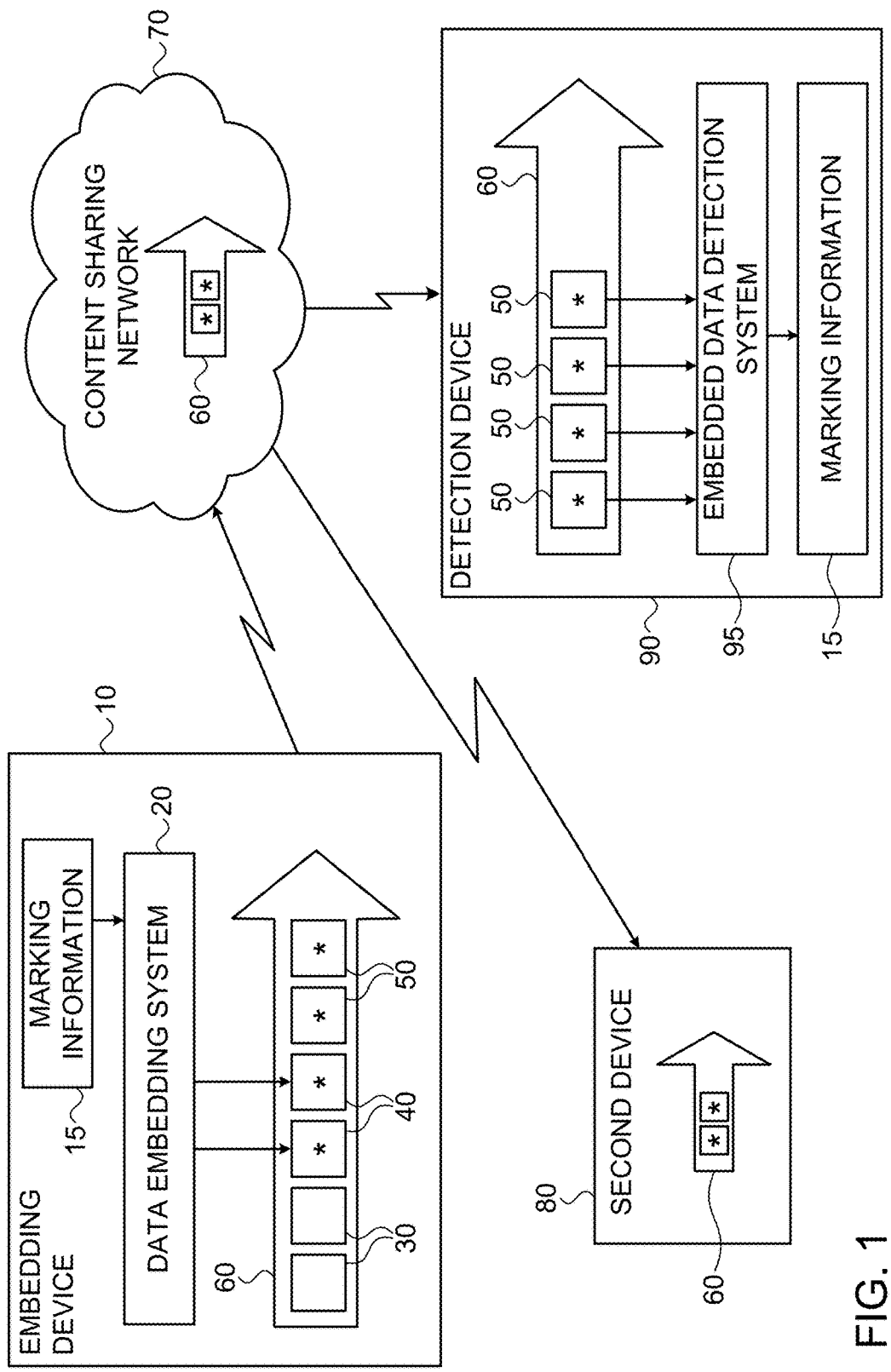
FIG. 1 is a simplified block drawing of a video data embedding system constructed and operative in accordance with an embodiment of the present invention.

Reference is now made to FIG. 1, which is a simplified block drawing of a video data embedding system constructed and operative in accordance with an embodiment of the present invention. The system of FIG. 1 comprises an embedding device 10. The embedding device 10 comprises marking information 15 and a data embedding system 20.

Figure 2:
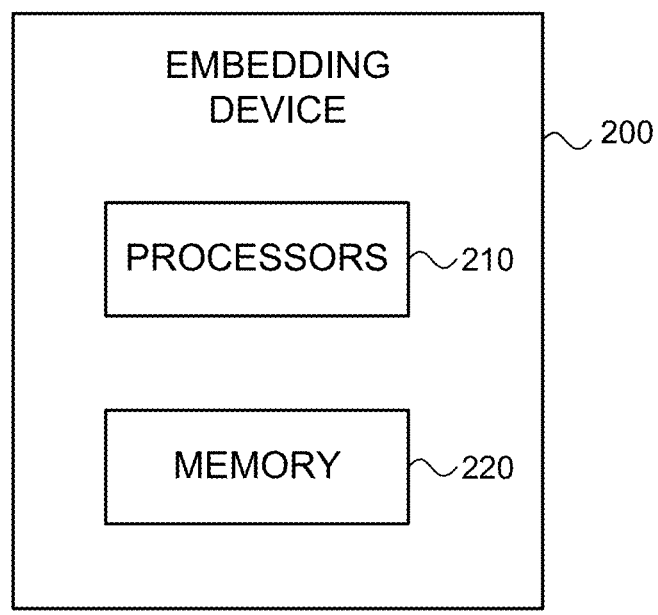
FIG. 2 is a block diagram drawing of an embedding device for use in the system of FIG. 1.

Reference is now additionally made to FIG. 2, which is a block diagram drawing of the embedding device 200 for use in the system of FIG. 1. The embedding device 200 comprises hardware and software components, as is well known in the art.

The embedding device 200 comprises at least one processor 210, and may comprise more than one processor 210. One of the processors 210 may be a special purpose processor operative to perform the watermark embedding, according to the method described herein. In addition, the embedding device 200 comprises non-transitory computer-readable storage media (i.e. memory) 220. The memory 220 may store instructions, which at least one of the processors 210 may execute, in order to perform the method of watermark embedding described herein.

It is appreciated that a detection device 90 of FIG. 1 may also be designed with the same or similar components as were described in the preceding paragraph for the embedding device 200.

Returning to the discussion of FIG. 1, the watermark embedding device 10 may be one of:

a content rendering device, such as a device for use by an end user. For example, and without limiting the generality of the foregoing, the content rendering device may be a set top box, a desk top device, a tablet device, handheld device, or any other device with the computing power and capability to render the content. It is appreciated that in such a case, the data embedding system 20 would require access to the clear uncompressed video (assuming that the content is video) or to the decoding/decompressing process of the encoded/compressed video. It is further appreciated that some of the processing of performed by the content rendering device may be performed by a virtual processor, such as, by way of example, a remote processor located in the cloud.

a device located at the content providing headend.

The marking information 15 comprises any appropriate information. In some embodiments, the marking information 15 may comprise non-forensic information. That is to say, the marking information 15 may not identify a specific user or device, but rather, may identify other information, such as channel ID, movie ID, service provider ID etc. In which case, the watermark would typically be embedded at the headend.

Alternatively and without limiting the generality of the foregoing, the marking information 15 may be information identifying a user (i.e. forensic information) with whom the content is somehow uniquely associated, as will be explained below, and include a unique device ID of the content rendering device, or some other device (or "sub-device" such as a smart card) which has a unique identifying number and an association with the user. Alternatively the marking information may comprise a copyright mark or other access rights data, for example and without limiting the generality of the foregoing, the playback/copying permissions to be obeyed by the content rendering device. Those skilled in the art will appreciate that copyright information may, for example and without limiting the generality of the foregoing, be a single bit, indicating either "copyrighted content"/"not copyrighted content". Alternatively, copyright may be indicated in a plurality of bits, such as, and without limiting the generality of the foregoing, bits indicative of permission to copy but not to burn to CD. It is assumed that authorized playback devices respect such signals, while unauthorized playback devices are assumed not to respect such signals. It is appreciated that combinations of appropriate types of identifying information may alternatively be used as the marking information 15.

The data embedding system 20 is operative to inject embedded data, depicted in FIG. 1 as an asterisk, *, onto frames 30, 40, 50 of a video stream 60.

The operation of the system of FIG. 1 is now described. The video stream 60 is depicted as comprising three distinct types of video frames:

Frames 30 not yet comprising embedded data;
frames 40 presently being embedded with data; and
frames 50 already embedded with data.

The data embedding system 20 receives the marking information 15 as an input, generates the embedded data, depicted in the figure as an asterisk, *, and injects a watermark into the frames presently being embedded with data 40.

Content comprising the video stream 60, now comprising a plurality of frames 50 already embedded with data, may be uploaded or otherwise made available on a content sharing network 70. The content sharing network 70 typically comprises a either a streaming content sharing network or a peer-to-peer content sharing network. Alternatively, the content sharing network 70 may comprise any appropriate type of online and/or offline content distribution scheme, for example and without limiting the generality of the foregoing, retail sale of pirated DVDs. A second device 80, which is able to render the content comprising the video stream 60 may then acquire the video stream 60 from the content sharing network 70.

A broadcaster, a content owner, or other appropriately authorized agent may also acquire the video stream 60 from the content sharing network 70. Upon acquisition of the video stream 60 from the content sharing network 70 by the broadcaster, content owner, or other interested stakeholder, the video stream 60 is input into a detection device 90. The detection device 90 detects and extracts the embedded data, depicted as an asterisk, *, from each of the frames already embedded with data 50 comprised in the video stream 60. The extracted embedded data is then input into an embedded data detection system 95. The embedded data detection system 95 is able to determine the injected marking information 15 from the input embedded data.

Figure 3:
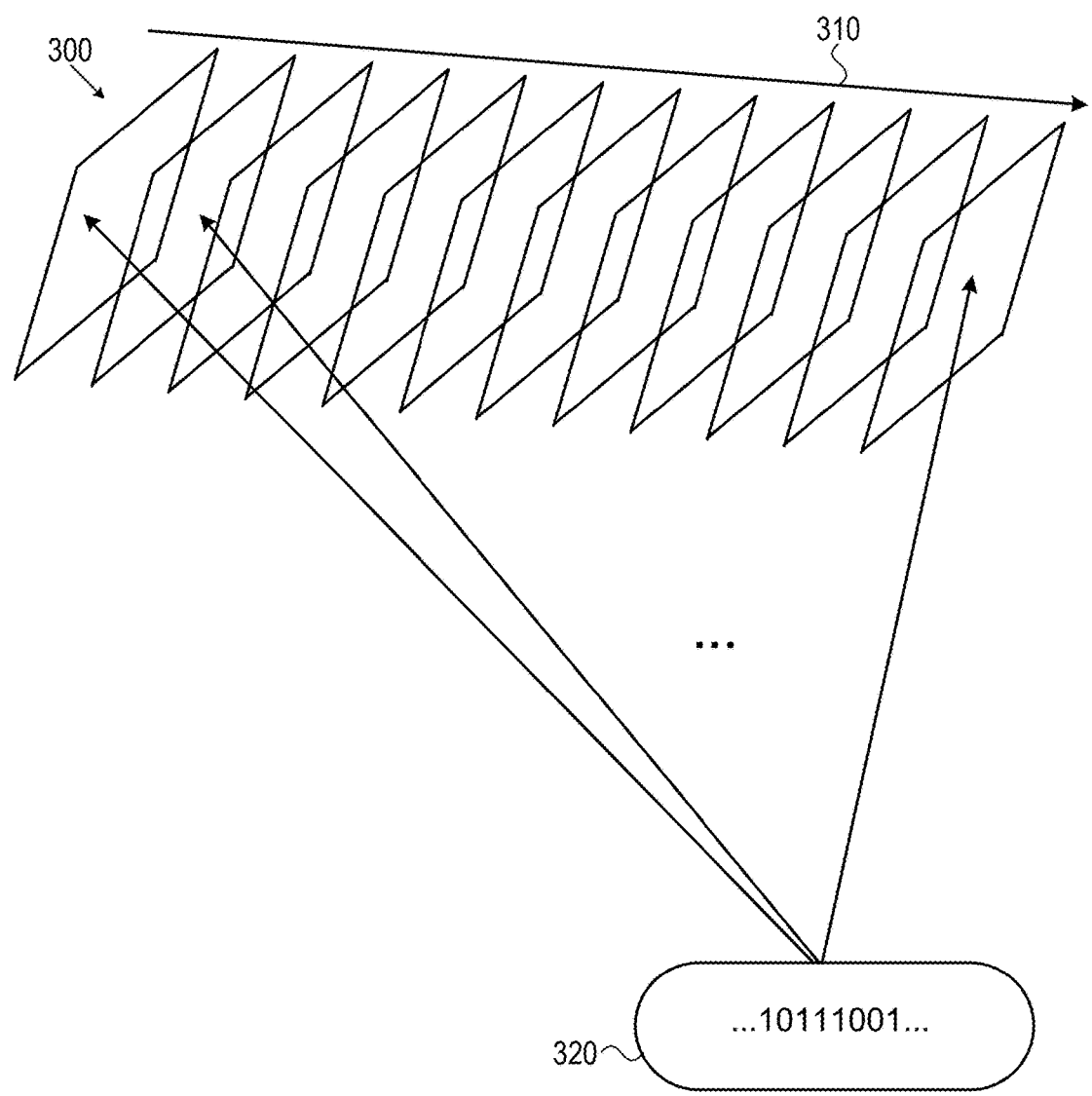
FIG. 3 is a simplified block drawing depicting the video data embedding system of FIG. 1 embedding the data into a sequence of video frames.

Reference now made to FIG. 3, which is simplified block drawing depicting the video data embedding system of FIG. 1 embedding the data into a sequence of video frames. FIG. 3 depicts what happens in the embedding device 200 on a very high level. A plurality of video frames 300 is depicted, and arrow 310 indicates that the frames 300 depicted on the left side of FIG. 3 are video frames prior to the frames 300 depicted on the right side of FIG. 3. A string of bits 320 is depicted. At least one bit of the string of bits 320 is encoded in selected frames of the plurality of video frames 300. For instance, one bit may be embedded in each one of the video frames. So, the first 1 of the 10111001 is embedded in the first video frame of the plurality of video frames 300. The second bit, 0, is embedded in the second video frame of the plurality of video frames 300. The third bit, 1 is embedded in the third video frame of the plurality of video frames 300, and so forth.

Alternatively, the embedding scheme may entail embedding a number of bits in a single video frame, or embedding a single bit in every third video frame, or any other variation and combination of bits and frames. Some examples of this will be discussed below with reference to FIG. 4 and FIG. 6.

Those skilled in the art will appreciate that a digital video frame is presented to a viewer as an ordered arrangement of pixels on a viewing monitor or screen. Certain changes may be made to one or more of the pixels which will, typically, not be perceptible to the viewer. For example and without limiting the generality of the foregoing, a color element of the pixel may be represented by a triad of Red-Green-Blue values, typically expressed as values ranging from 0-255. A slight change in the value of the Red-Green-Blue values, for example and without limiting the generality of the foregoing, from 179-221-18 to 184-220-20 will, typically, not be perceptible to the viewer.

Those skilled in the art will appreciate that pixel color may alternatively be expressed in any appropriate color space, such as any of the well-known Chrominance/Luminance systems (for instance, YCbCr; YPbPr; YDbDr), or according to the xvYCC standard, IEC 61966-2-4. For simplicity of discussion, pixel color is expressed herein, in a non-limiting manner, as a RGB triplet.

Figure 4A:
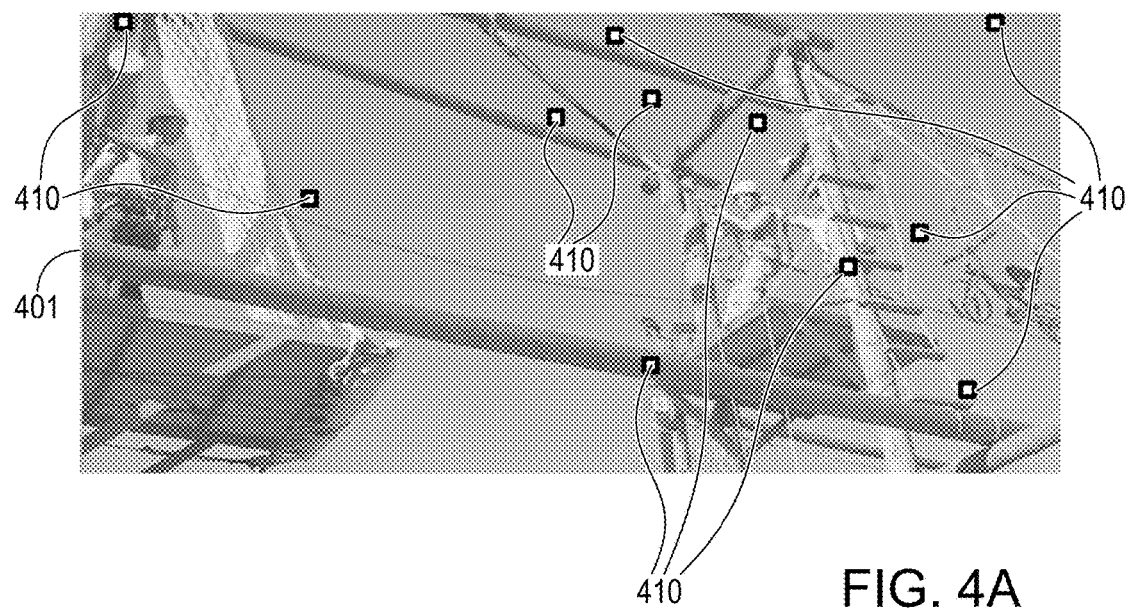
FIGS. 4A and 4B are simplified pictorial illustrations of two video frames comprising watermarking information embedded using the system of FIG. 1.
Figure 4B:
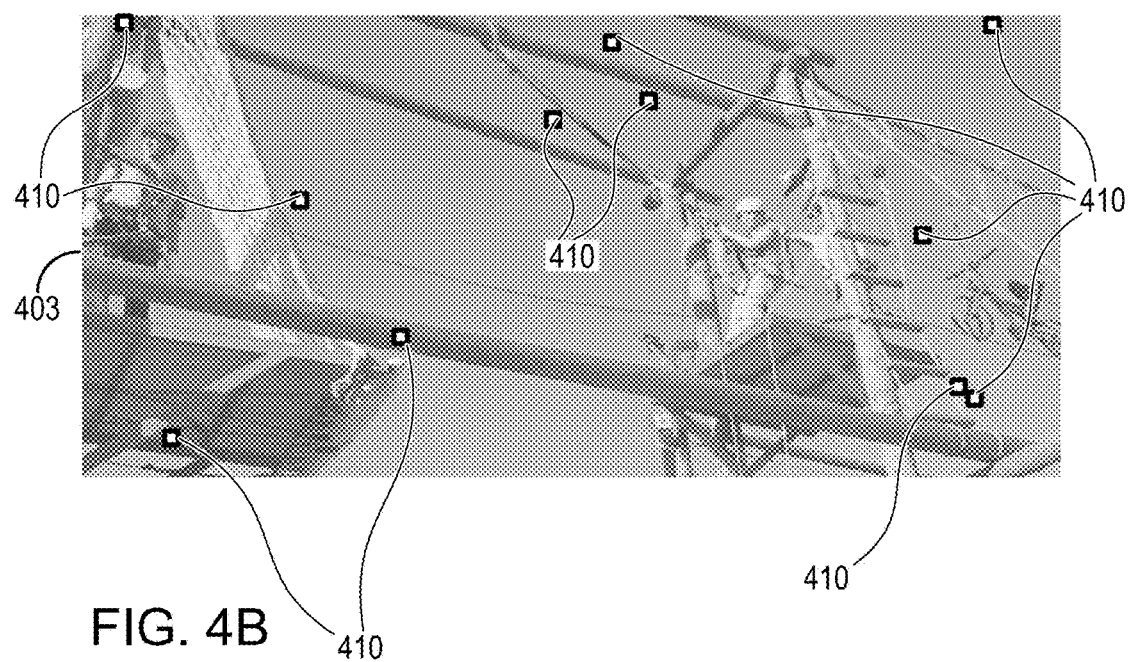

Reference is now made to FIGS. 4A and 4B, which are simplified pictorial illustrations of two video frames comprising watermarking information embedded using the system of FIG. 1. FIGS. 4A and 4B show two very similar video frames 401, 403, in which various patches 410 are depicted as white squares with thick black borders. The patches represent portions of the video which comprise the watermark. The patches depicted in FIGS. 4A and B show where such patches might appear in a typical frame with an embedded watermark as described herein. However, it is appreciated that the method described below for embedding the watermark in the video is designed so that the watermark should be imperceptible, or nearly imperceptible to the typical viewer of the video.

It is appreciated that the patches are depicted as squares. In practice, the patches are typically squares, for example squares of 2×2 pixels; 4×4 pixels; or 8×8 pixels. However, the patches may also be rectangular, of small size, similar to the square patches mentioned above, e.g. 2×3 pixels or 4×6 pixels.

Figures 5A, 5B:
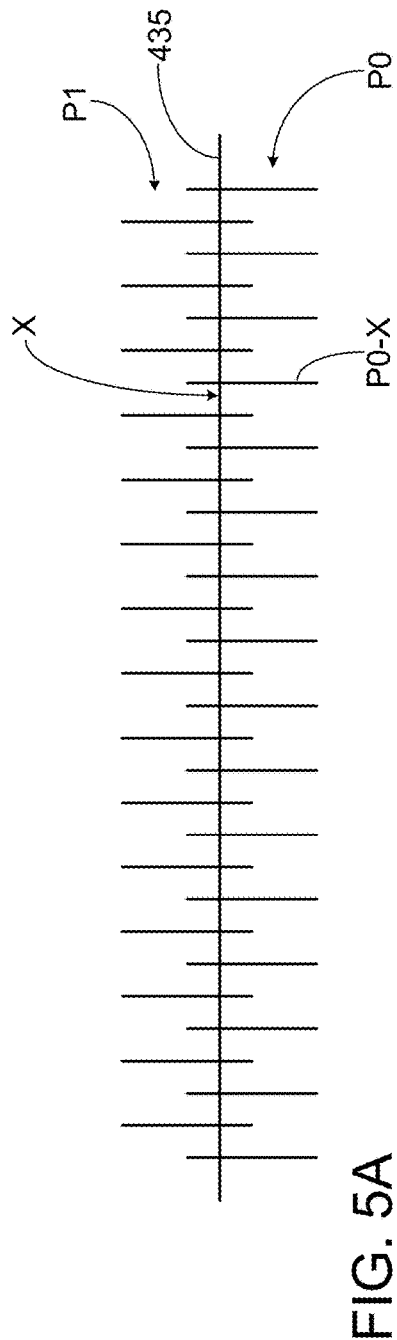
Figure 5C:
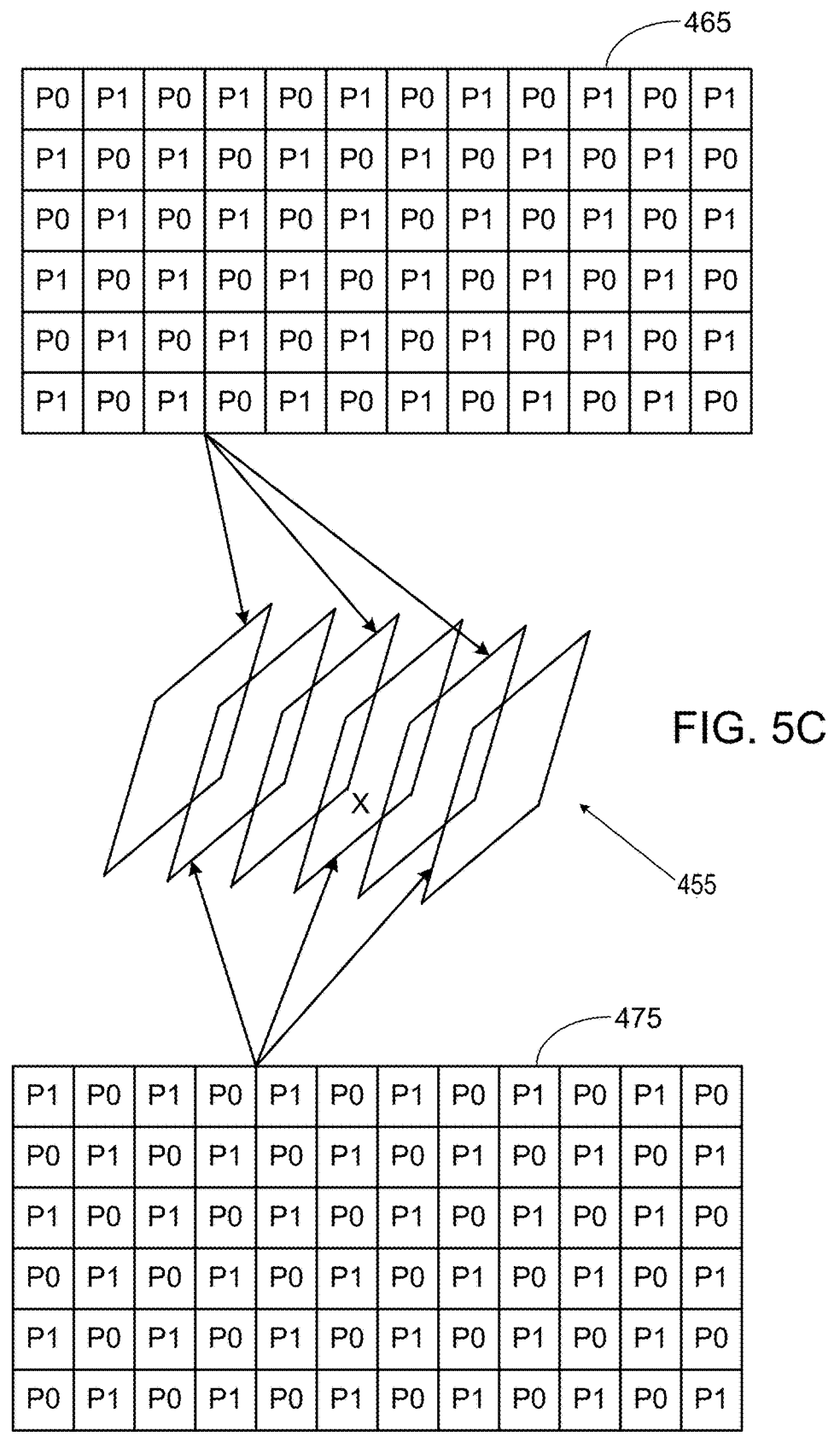

Reference is now additionally made to FIGS. 5A-5C, which are depictions of mutually distinct palettes depicted in, respectively, one-, two-, and three-dimensional color space, for use in the discussion of FIGS. 4A and 4B. Accordingly, in an appropriate color space, such as RGB, YUV, or YCbCr two mutually distinct collections, denoted "palettes" of pixel values are chosen within the entire space. Turning to FIG. 5A, a one-dimensional color space line 435

(e.g. Red or Y) is depicted (similar to a number line). At equal distances two alternating sets of perpendicular lines cross the one-dimensional color space line 435. One set of lines (i.e. the descending lines) intersecting the one-dimensional color space line 435 is designated P0. A second set of lines (i.e. the ascending lines) intersecting the one-dimensional color space line 435 is designated as P1. These would correspond, in the discussion of FIG. 4 to two sets of palettes. P0 and P1. A value in the one-dimensional color space of line 435 which is to be encoded as a 0 would, by way of example, be modified to be the value of the P0 point to which it is nearest. For example, if the point X on the one-dimensional color space line 435 is to encode a 0, then it would be modified to become the point designated P0-X.

It is appreciated that although the alternating sets of lines are depicted as being equally spaced, the points in the palettes need not be equidistant from each other, although it is a natural choice to so position the points. It is also appreciated that this is the case for the examples given below in FIGS. 5B and 5C.

Turning now to FIG. 5B, a two-dimensional color space plane 445 (e.g. RG or YU) is depicted. At the center of each alternate box is either the legend P0 or P1, indicating that two palettes, P0 and P1 are located at the center point of each alternative box. A point X, being closer to a P1 point, would, accordingly, be modified to be the P1 point to which it is closest, labeled here as P1-X. Although FIG. 5B (and FIG. 5C, below) depicts alternating boxes, it is appreciated that every such palette member is a point, not a box. It's true that there is a "box of influence" which is the area where the nearest palette neighbor will be from P0 or P1. But the palette member is just one color tuple, and thus a point.

Turning now to FIG. 5C, a three-dimensional color space 455 (e.g. RGB or YUV) is depicted. Alternative planes in the space either are comprised of one of two planes 465, 475 with different, alternative, P0/P1 spacing patterns. A point X, depicted in the three-dimensional color space 455 would be modified to be the P0 or P1 point to which it is nearest in the three-dimensional color space 455.

Returning now to the discussion of FIGS. 4A and 4B, the pixel values in the selected palettes are chosen to be "dense". That is to say, for each pixel value in the color space, there is a member of (either of) the palette(s), to which the pixel value is close in value, according to any acceptable metric. For the sake of convenience, one palette will be referred to hereinafter as P0, and the second palette will be referred to hereinafter as P1. For example let P0={(16i,16j, 16k)|i,j,k=0, . . . 15 and i+j+k % 2==0} and P1={(16i,16j, 16k)|i,j,k=0, . . . 15 and i+j+k % 2==1}.

The number of bits of data to be encoded in each frame of video is a configuration parameter which is then used by the embedder 10 (FIG. 1) and the detector 90 (FIG. 1). This value is denoted hereinafter as BpF (bits per Frame). It is appreciated that as BpF increases, capacity (i.e. the number of bits encoded in each frame) of the watermark increases at the cost of imperceptibility of the watermark. Typically, by way of example, BpF may range from 1 to 4. (See further discussion of this, below, with reference to FIGS. 5 and 6.)

A collection of N small rectangles of pixels—"patches"— are chosen uniformly across a first video frame. Typically, the N patches are selected so as to not overlap macroblock boundaries. If the N patches do not overlap macroblock boundaries, then the patches are more resilient to changes in pixel color values due to the effects of video transcoding.

It is appreciated that in typical embodiments, the value of N provides a tradeoff between imperceptibility and robustness of the watermark. Typical values of N may be set between 11 and 15. However, the patches may also be rectangular, of small dimensions, similar to the square patches mentioned above. It is appreciated that the values of 11 and 15 for N are odd, and hence ease using the majority operation during detection, as described below. N may of course be other values as well. As N increases, however, robustness of the watermark increases, at the cost of imperceptibility of the watermark.

The locations of the patches might be fixed in all frames of the video, or might change from frame to frame according to various possible patch movement schemes which are outside the scope of the invention (as is the case in frames 401 and 403 of FIGS. 4A and 4B), as long as during the detection stage it can be determined what the frame positions are based on, such as, and without limiting the generality of the foregoing, some shared secrets and/or on possible self-synchronizing features of the patch movement schemes. For the sake of simplicity it is assumed henceforth that the patches are in fixed positions in all frames of the video, and their locations are known during the detection stage.

According to the BpF value, the collection N patches are divided into subcollections of patches. For example, and without limiting the generality of the foregoing, if BpF=1, then the subcollections of patches comprises all N patches. However, if BpF=2, then one subcollection might comprise 9 patches and a second subcollection would comprise 6 patches, assuming that N=15. Similarly, if BpF=3, then two subcollections might comprise 4 patches each, and the third subcollection would comprise 3 patches, assuming that N=11. If BpF=4, then there might be two subcollections of 2 patches each, one subcollection of 3 patches, and one subcollection of 4 patches, assuming that N=11.

Given a video sequence made up by frames F_1, F_2, F_n (see, for instance the plurality of video frames 300 in FIG. 3), and a payload to encode (see, for instance, the string of bits 320 in FIG. 3), then, for video frame F_i, the BpF payload bits associated with frame F_i are encoded using the method described below. For ease of description, what follows assumes that BpF=1. If BpF>1, the encoding procedure is repeated for each subcollection of patches within the video frame, using each subcollection to encode one of the BpF bits associated with the frame.

For each frame in which patches are to be encoded:
  For each one of patches to be encoded:
  1. Choose the palette P0 or P1—if the value of the payload bit to be encoded is j, use palette Pj. It is appreciated that this convention of using palette Pj to encode j is a convenience, and in principle, it would be possible to use P0 to encode 1 and P1 to encode 0.
  2. One of variance and edginess is calculated either over the location of the patch being encoded or, alternatively, over a wider area with the location of the patch at the center of the wider area. It is appreciated that, in the present specification and claims that the term "edginess" is used to indicate a result of performing edge detection. An area with a lot of edges would have a high level of edges, i.e. would be "edgy". Conversely, an area with few edges would have a low level of edges, i.e. would be "not edgy". Alternatively, a frame with a high/low level of edges would be referred to as having high/low edginess.

For the purposes of the present invention, variance need not be determined by individual scalar value (although it could be) in the pixel triplet (i.e. not R and G and B or, alternatively, Y and U and V), but rather by summing up the three coordinates of the variance and compare that sum to a scalar threshold.

3. If one of variance and edginess is below some given threshold chosen with the tradeoff between robustness vs. imperceptibility of the watermark, then:
        a. Calculate a value using the pixel values as an input to a function. The function used to calculate the value may be, by way of example, a weighted average (i.e. mean), a median, a mode, or a geometric mean.
        b. From the chosen palette, choose the closest value to the calculated value in the palette, where distance is any reasonable distance measure (for example the geometric distance L2 between pixels values). It is appreciated that once one metric is selected as the "reasonable distance measure" to be used, that same metric is used throughout all calculations in the embedding and detection procedures.
        c. Replace the pixel values within the patch with the value chosen in the previous step.
    4. If the one of the variance and edginess edge detection is above the given threshold, the pixels comprising the selected patch are not replaced.

At this stage, the watermark is embedded in the video frame, and processing of the video frame proceeds normally.

It is appreciated that the use of the term "encoding" in the sense of "encoding" a bit in a patch within a frame is understood in the sense of "embedding" the patch of an appropriate value from an appropriate palette corresponding to the bit' value. Whereas the term "encoding" in the sense of "encoding" the frame is understood to mean "video encoding" as that term is understood in the art.

In some embodiments of the method described above, if the number of modified patches is below some threshold denoted MinPatch, determined by the embedder of the watermark initially, the entire frame might be skipped altogether, without being used to encode any bits. The detection phase will identify this frame, as described below.

It is appreciated that Error detection and correction codes such as the Reed-Solomon code can and should be applied on the original payload to create an encoded codeword, and it is the bits of these codewords which are used as the payload bits in the description above.

Figure 6:
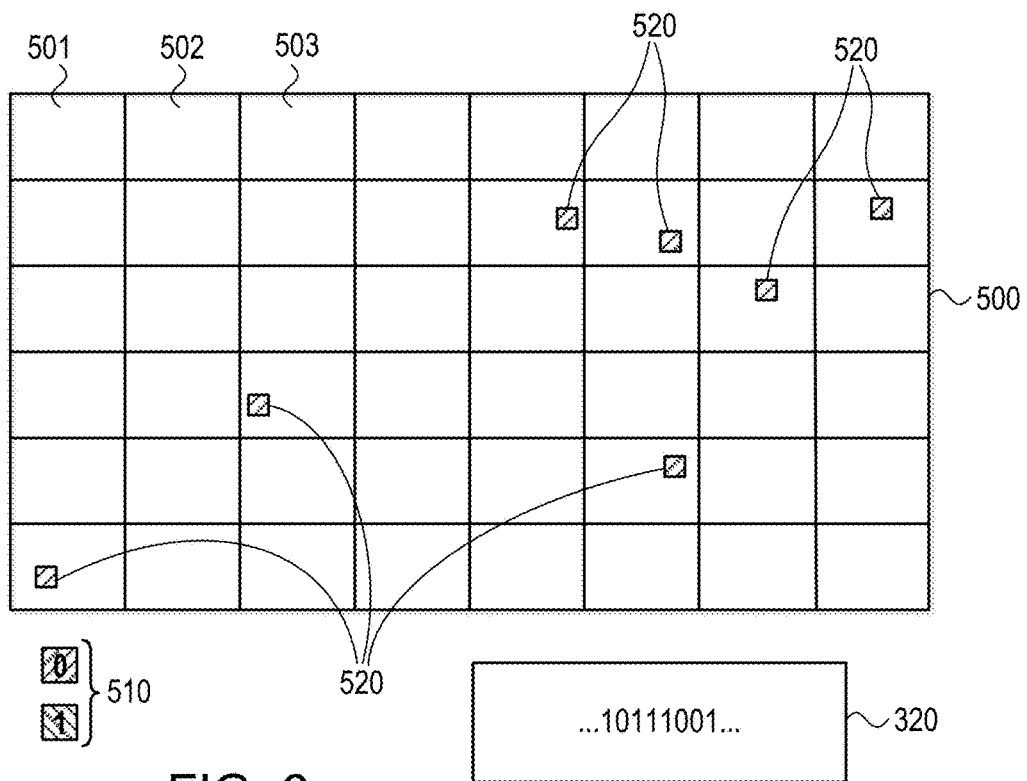
FIG. 6 is a simplified depiction of a single video frame in which a single bit of payload data has been encoded using the system of FIG. 1.

Reference is now made to FIG. 6, which is a simplified depiction of a single video frame 500 in which a single bit of payload data has been encoded using the system of FIG. 1. FIG. 6 shows a single video frame 500 which is divided into a plurality of macroblocks 501, 502, 503 (and so forth—the remainder of the macroblocks are not numbered, even though they are indicated in the drawing).

A legend 510 indicates which patterns are used to indicate an encoded 0 and an encoded 1. 7 patches 520 are shown in the video frame 500, all of which are hatched to show a value of an encoded zero. The encoded zero may correspond to the second to last bit in the payload string of bits 320. If only the eight bits of the payload string of bits 320 were being encoded in the plurality of video frames, then video frame 500 would then be the 7th frame comprising the patches representing the encoded bits.

Figure 7:
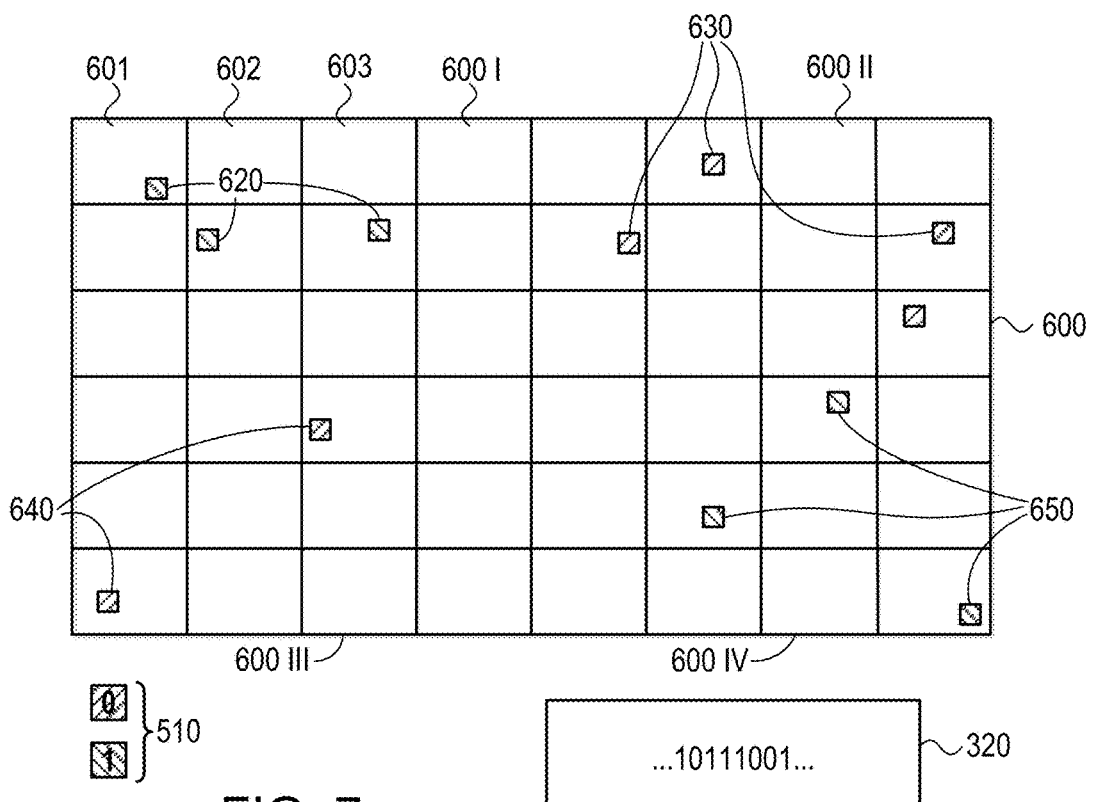
FIG. 7 is a simplified depiction of a single video frame in which four bits of payload data have been encoded using the system of FIG. 1.

Reference is now made to FIG. 7, which is a simplified depiction of a single video frame 600 in which four bits of payload data have been encoded using the system of FIG. 1. Video frame 600 has been subdivided into four quadrants, which are designated as quadrant 600I, 600II, 600III, and 600IV. Video frame 600 has also been divided into a plurality of macroblocks 601, 602, 603 (and so forth—the remainder of the macroblocks are not numbered, even though they are indicated in the drawing).

The legend 510 indicates which patterns are used to indicate an encoded 0 and an encoded 1. In the example depicted in FIG. 7, the last four bits of the eight bits of the payload string of bits 320, that is the bits 1001, are encoded in the patches embedded in video frame 600. Quadrant 600I comprises patches 620 which are encoded for as 1, corresponding to the first bit (1) of the string 1001. Quadrant 600II comprises patches 630 which are encoded for as 0, corresponding to the second bit (0) of the string 1001. Quadrant 600III comprises patches 640 which are encoded for as 0, corresponding to the third bit (0) of the string 1001. Quadrant 600IV comprises patches 650 which are encoded for as 1, corresponding to the fourth and final bit (1) of the string 1001.

Persons skilled in the art will appreciate that a similar approach to embedding the watermark may be taken, in which the watermark described above, or one similar in nature is embedded using direct manipulation of discrete cosine transform (DCT) coefficients of some of the macroblocks of either I-frames or I-type macroblocks in non-I-frames.

It is also appreciated that DCT coefficient values may be used as a good approximation to the inner variance of a patch (i.e. if there are many non-zero high-index DCT coefficients, for example, then the ratio of noise to variance is high). In such a case, "flattening" out (i.e. averaging out) a patch, as described above, would be a good approximation of the method described above, by leaving just the low index DCT coefficients matching the patch area (known as the DC coefficient), and zeroing out the subsequent DCT coefficients matching the patch area.

The detection device detection device 90 and its components, are depicted in FIG. 1, and also discussed following the discussion of the embedding device 200 in the description of FIG. 2. Turning now to the method of detection of the watermark embedded using the techniques described above, once the video stream 60 (FIG. 1) to be analyzed is acquired and input into the detection device 90 (FIG. 1), the following method is performed.

As above, assume that BpF=1. If BpF>1, then the same process is repeated for each subcollection of patches.

For each video frame in which there might be watermarked patches (candidate patches):
    In each of the patches, perform the following:
    1. Calculate one of variance and edginess for a candidate patch.
    2. If one of variance or edginess for the candidate patch is below some given threshold, then:
        a. Determine whether the output of the function used to embed the watermark (e.g. a weighted average (i.e. mean), a median, a mode, or a geometric mean) is closer under some distance measure (e.g. Geometric distance, etc.) to a member of P0 or to a member of P1. This choice will be the candidate patch's "output bit". That is to say, assuming that Pj encodes bit j, then if the distance is closer to palette P0, then the output bit for the patch will be 0. Similarly, if the distance is closer to palette P1, then the output bit for the patch will be 1.

b. If one of variance or edginess for the candidate patch is above the given threshold, then the patch is ignored.
3. Of all the patches which were not ignored, take the majority of their output bits for the frame. This bit is the guess for the payload bit for this frame.
4. If the number of patches that weren't ignored is below the threshold MinPatch this indicates that this frame was skipped during the embedding phase, and should be skipped here as well.
5. Continue this procedure to recover the bits of the original payload by applying any error correcting methods provided by the error correction code used to encode/re-encode the watermarked frames.

The detection method may be enhanced using confidence levels. During detection, the distance between the output of the function used to embed the watermark (e.g. a weighted average (i.e. mean), a median, a mode, or a geometric mean), hereinafter, the "central value" of the candidate patch being evaluated to a nearest neighbor in each of the palettes can serve as a confidence level as to the value of the patch. For example, if the closest neighbor in each of the two palettes P0 and P1 are approximately equidistant, then the confidence value is low. On the other hand, if one of the two values of either P0 or P1 is much closer to the value than the other of the two values, then the confidence is high that the closer of the two values is the correct value. Thus, if v is the central value of the candidate patch, the nearest neighbors are n0 and n1, then the confidence level would be proportional to $1/[\min(\text{dist}(v, n0), \text{dist}(v, n1))]$.

With such confidence levels for every patch, one can, for example, sum all of the confidence levels for the patches that are closer to P0 (hereinafter C0) and all of the confidence levels for the patches that are closer to P1 (hereinafter C1). It can then be evaluated in the decoded bit is 0 or 1 by seeing if C0>C1 or if C0<C1.

An example of applying the method described above is now provided. Consider the RGB values of 8×8 pixel patch in a single frame, prior to embedding the watermark:

$R$: [ 105 105 105 105 103 103 103 103 ]
 [ 105 105 105 105 103 103 103 103 ]
 [ 104 104 104 104 103 103 103 103 ]
 [ 104 104 104 104 103 103 103 103 ]
 [ 105 105 105 105 104 104 104 104 ]
 [ 105 105 105 105 104 104 104 104 ]
 [ 106 106 105 105 104 104 104 104 ]
 [ 106 106 105 105 104 104 104 104 ]

$G$: [ 155 155 155 155 155 155 155 155 ]
 [ 155 155 155 155 155 155 155 155 ]
 [ 156 156 156 156 155 155 155 155 ]
 [ 156 156 156 156 155 155 155 155 ]
 [ 157 157 157 157 156 156 156 156 ]
 [ 157 157 157 157 156 156 156 156 ]
 [ 156 156 157 157 156 156 156 156 ]
 [ 156 156 157 157 156 156 156 156 ]

$B$: [ 215 215 217 217 215 216 216 216 ]
 [ 215 215 217 217 216 216 216 216 ]
 [ 215 215 217 217 216 216 216 216 ]
 [ 215 215 217 217 216 216 216 216 ]
 [ 218 218 218 218 217 217 217 217 ]
 [ 218 218 218 218 217 217 217 217 ]
 [ 218 218 218 218 217 217 217 217 ]
 [ 218 218 218 218 217 217 217 217 ]

The (R, G, B) mean values are: (104.1875, 155.8125, 216.75).

The sum of the R, G and B variances is 2.242, which is below the threshold. Accordingly, this patch is made active (i.e. selected to have a watermark embedded). In the present example, it is desired to embed the bit 1, and thus, the palette P1 is used. The exemplary palette P1 provided above was: P1={(16i,16j,16k), i,j,k=0, . . . 15|i+j+k % 2==1}.

In this particular example, the threshold is 30. The threshold was selected to allow enough patches to remain active, but keep the noisier (higher variance) patches inactive. It will be appreciated that the threshold depends on the size of the patch selected, the type of video, even somewhat on the size of the palettes themselves.

In the palette P1, the closest neighbor by the geometric distance in P1 is (112, 160, 224).

The patch after embedding this value, prior to video encoding, becomes:

$R$: [ 112 112 112 112 112 112 112 112 ]
 [ 112 112 112 112 112 112 112 112 ]
 [ 112 112 112 112 112 112 112 112 ]
 [ 112 112 112 112 112 112 112 112 ]
 [ 112 112 112 112 112 112 112 112 ]
 [ 112 112 112 112 112 112 112 112 ]
 [ 112 112 112 112 112 112 112 112 ]
 [ 112 112 112 112 112 112 112 112 ]

$G$: [ 160 160 160 160 160 160 160 160 ]
 [ 160 160 160 160 160 160 160 160 ]
 [ 160 160 160 160 160 160 160 160 ]
 [ 160 160 160 160 160 160 160 160 ]
 [ 160 160 160 160 160 160 160 160 ]
 [ 160 160 160 160 160 160 160 160 ]
 [ 160 160 160 160 160 160 160 160 ]
 [ 160 160 160 160 160 160 160 160 ]

$B$: [ 224 224 224 224 224 224 224 224 ]
 [ 224 224 224 224 224 224 224 224 ]
 [ 224 224 224 224 224 224 224 224 ]
 [ 224 224 224 224 224 224 224 224 ]
 [ 224 224 224 224 224 224 224 224 ]
 [ 224 224 224 224 224 224 224 224 ]
 [ 224 224 224 224 224 224 224 224 ]
 [ 224 224 224 224 224 224 224 224 ]

As a result of variations introduced in pixel values during the encoding process, the pixel values undergo some slight changes, and become:

$$R: \begin{bmatrix} 113 & 113 & 113 & 111 & 111 & 111 & 111 & 111 \\ 111 & 113 & 111 & 111 & 111 & 111 & 111 & 111 \\ 111 & 111 & 111 & 111 & 111 & 111 & 111 & 111 \\ 111 & 111 & 111 & 111 & 111 & 111 & 111 & 111 \\ 111 & 111 & 111 & 111 & 111 & 111 & 111 & 111 \\ 111 & 111 & 111 & 111 & 111 & 111 & 111 & 111 \\ 111 & 111 & 111 & 111 & 111 & 111 & 111 & 111 \\ 111 & 111 & 111 & 111 & 111 & 111 & 111 & 111 \end{bmatrix}$$

$$G: \begin{bmatrix} 159 & 159 & 159 & 160 & 160 & 160 & 160 & 160 \\ 160 & 159 & 160 & 160 & 160 & 160 & 160 & 160 \\ 160 & 160 & 160 & 160 & 160 & 160 & 160 & 160 \\ 160 & 160 & 160 & 160 & 160 & 160 & 160 & 160 \\ 160 & 160 & 160 & 160 & 160 & 160 & 160 & 160 \\ 160 & 160 & 160 & 160 & 160 & 160 & 160 & 160 \\ 160 & 160 & 160 & 160 & 160 & 160 & 160 & 160 \\ 160 & 160 & 160 & 160 & 160 & 160 & 160 & 160 \end{bmatrix}$$

$$B: \begin{bmatrix} 223 & 223 & 223 & 223 & 223 & 223 & 223 & 223 \\ 223 & 223 & 223 & 223 & 223 & 223 & 223 & 223 \\ 223 & 223 & 223 & 223 & 223 & 223 & 223 & 223 \\ 221 & 223 & 223 & 223 & 223 & 223 & 223 & 223 \\ 223 & 223 & 223 & 223 & 223 & 223 & 223 & 223 \\ 223 & 223 & 223 & 223 & 223 & 223 & 223 & 223 \\ 223 & 223 & 223 & 223 & 223 & 223 & 223 & 223 \\ 223 & 223 & 223 & 223 & 223 & 223 & 223 & 223 \end{bmatrix}$$

Persons of skill in the art will appreciate the slight changes are normal artifacts of the encoding process. The pixel values of the resultant patch, as enumerated above are the pixel values of the patch which will be analyzed during the watermark detection phase.

The mean values found during detection are then: (111.125, 159.9375, 222.96875), and the variance value is now 0.354, so the patch is considered active. The closest neighbor (determined using geometric distance) in either P0 or P1 is (112, 160, 224) which is in P1—therefore the patch encodes the bit 1, which matches the encoding of the bit 1 in the embedding step, above.

Figure 8:
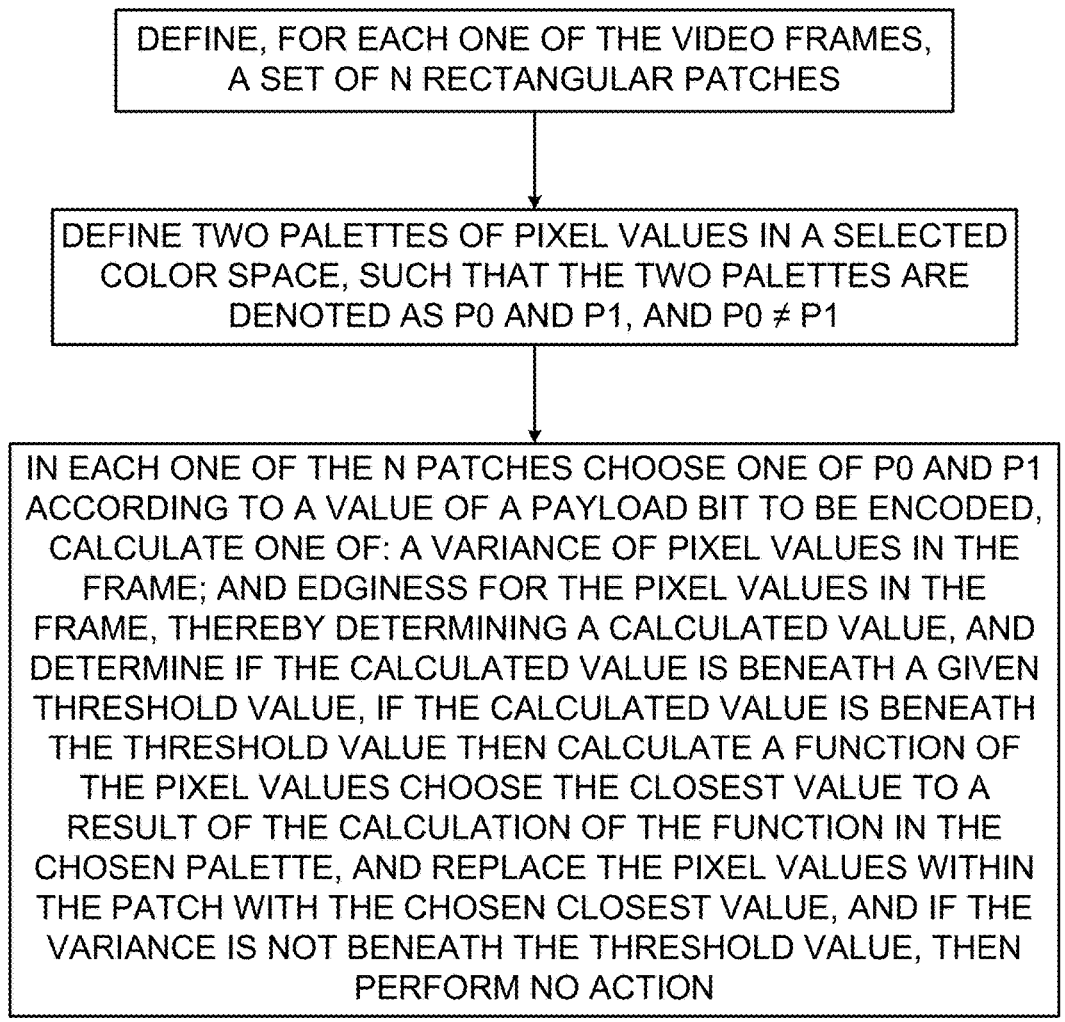
FIG. 8 is a simplified flow chart of a method of operation of the system of FIG. 1.

Reference is now made to FIG. 8, which is a simplified flow chart of a method of operation of the system of FIG. 1. The method of FIG. 8 is believed to be self-explanatory with reference to the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for embedding a watermark in a sequence of video frames, the method, executed at an embedding device, comprising:
   defining, for each one of the video frames, a set of N rectangular patches;
   defining two palettes of pixel values in a selected color space, such that the two palettes are denoted as P0 and P1, and P0≠P1; and
   in each one of the N patches:
   choosing one of P0 and P1 according to a value of a payload bit to be encoded;
   calculating one of: a variance of pixel values in the frame; and edginess for the pixel values in the frame, thereby determining a calculated value;
   determining if the calculated value is beneath a given threshold value; and
   replacing the pixel values within the patch with a new pixel value selected from the chosen palette if the calculated value is beneath the threshold value.

2. The method according to claim 1 wherein the variance is calculated on a value which is the sum of the scalar values of the components of the pixel values.

3. The method according to claim 1 wherein the calculating one of: a variance of pixel values in the frame; and edginess for the pixel values in the frame is performed on an area larger than the one of the N patches, the larger area centered on the patch.

4. The method according to claim 1 wherein the calculating one of: a variance of pixel values in the frame; and edginess for the pixel values in the frame is performed on the one of the N patches.

5. The method according to claim 1 wherein the threshold is heuristically determined, based, at least in part, on one of:
   a size of at least one of the N rectangular patches; and
   a size of the two palettes of pixel values.

6. The method according to claim 1 wherein the new pixel value is determined as a result of calculating one of: a mean; a medium; a mode; and a geometric mean, of the pixel values; and
   choosing the new pixel value to be a value closest to a result of calculating the one of: the mean; the medium; the mode; and the geometric mean, of the pixel values.

7. The method according to claim 1 wherein 2 to 4 bits are encoded in the video frame.

8. The method according to claim 7 wherein the rectangular patches are divided into 2 to 4 subgroups, according to the number of bits to be encoded in the video frame.

9. The method according to claim 1 wherein the N rectangular patches are uniformly distributed within the video frame.

10. The method according to claim 1 wherein the N rectangular patches do not overlap macroblock boundaries.

11. The method according to claim 1 wherein the selected color space comprises an RGB color space.

12. The method according to claim 1 wherein the sequence of video frames has had error detection and correction codes applied prior to applying the method of claim 1.

13. The method according to claim 1 wherein the selected color space comprises a YUV space.

14. The method according to claim 1 wherein the closest value is determined by determining a geometric distance.

15. The method according to claim 1 wherein if the number of patches which are to be modified in the frame is beneath a second threshold value, then the entire frame is skipped.

16. A system for embedding a watermark in a sequence of video frames, the system comprising:
- for each one of the video frames, a set of N rectangular patches;
- two palettes of pixel values in a selected color space, such that the two palettes are denoted as P0 and P1, and P0≠P1;
- a processor which chooses one of P0 and P1 in each one of the N patches according to a value of a payload bit to be encoded;
- a calculator which calculates, in each one of the N patches, one of: a variance of pixel values in the frame; and edginess for the pixel values in the frame, thereby determining a calculated value;
- a processor which determines if the calculated value is beneath a given threshold value in each one of the N patches; and
- a replacer which replaces the pixel values within the patch with a new value selected from the chosen palette if the calculated value is beneath the threshold value.

* * * * *